United States Patent
Abbott et al.

(10) Patent No.: US 9,057,036 B2
(45) Date of Patent: Jun. 16, 2015

(54) PROCESS FOR GENERATING A SYNTHETIC NATURAL GAS

(75) Inventors: Peter Edward James Abbott, Eaglescliffe (GB); Norman Macleod, Hartlepool (GB); Gordon Edward Wilson, Stockton-on-Tees (GB)

(73) Assignee: Johnson Matthey PLC, London (GB)

( * ) Notice: Subject to any disclaimer, the term of this patent is extended or adjusted under 35 U.S.C. 154(b) by 46 days.

(21) Appl. No.: 13/884,821

(22) PCT Filed: Oct. 17, 2011

(86) PCT No.: PCT/GB2011/052008
§ 371 (c)(1),
(2), (4) Date: Aug. 1, 2013

(87) PCT Pub. No.: WO2012/063034
PCT Pub. Date: May 18, 2012

(65) Prior Publication Data
US 2013/0317126 A1 Nov. 28, 2013

(30) Foreign Application Priority Data
Nov. 11, 2010 (GB) .................................. 1019054.4

(51) Int. Cl.
*C10L 3/08* (2006.01)
*C01B 3/58* (2006.01)
(Continued)

(52) U.S. Cl.
CPC ... *C10L 3/08* (2013.01); *C01B 3/58* (2013.01); *C01B 2203/0485* (2013.01);
(Continued)

(58) Field of Classification Search
CPC ... C10L 3/08; C10L 2290/02; C10L 2290/04; C10L 2290/06; C10L 2290/08; C10L 2290/10; C10L 2290/542; C07C 9/04; C10K 1/32; C10K 1/20; B01D 2253/1122; B01D 2253/104; B01D 2253/1124; B01D 2257/306; B01D 53/02; B01D 53/04; B01J 20/0237; B01J 20/0244; B01J 20/08; B01J 20/28004; B01J 20/28016; B01J 20/2803; B01J 20/3028; C01B 2203/042; C01B 2203/0445; C01B 2203/047; C01B 2203/0485; C01B 2203/0495; C01B 2203/061; C01B 3/58; C01G 2300/1011; C01G 2300/1022; C01G 2300/202; C01G 2/32; C10J 2300/093; C10J 2300/1618; C10J 3/00
USPC ................................................ 518/702, 705
See application file for complete search history.

(56) References Cited

U.S. PATENT DOCUMENTS 3,728,093 A * 4/1973 Cofield ............................ 48/190
4,323,366 A * 4/1982 Staudinger ........................ 48/73

FOREIGN PATENT DOCUMENTS

DE 929 265 6/1955
EP 0 243 052 A2 10/1987
(Continued)

OTHER PUBLICATIONS

Quinn et al., "An evaluation of synthesis gas contaminants as methanol synthesis catalysts poisons," *Applied Catalysis A: General*, 2004, vol. 272, No. 1-2, pp. 61-68.
(Continued)

*Primary Examiner* — Jafar Parsa
*Assistant Examiner* — Amy C Bonaparte
(74) *Attorney, Agent, or Firm* — RatnerPrestia

(57) ABSTRACT

A process for reducing the thiophene content in a synthesis gas mixture, comprises the steps of (i) passing a synthesis gas mixture comprising hydrogen and carbon oxides and containing thiophene over a copper-containing sorbent disposed in a sorbent vessel at an inlet temperature in the range 200-280° C., (ii) withdrawing a thiophene depleted synthesis gas containing methanol from the sorbent vessel, and (iii) adjusting the temperature of the methanol-containing thiophene-depleted synthesis gas mixture. The resulting gas mixture may be used for production of chemicals, e.g. methanol production or for the Fischer-Tropsch synthesis of liquid hydrocarbons, for hydrogen production by using water gas shift, or for the production of synthetic natural gas.

13 Claims, 1 Drawing Sheet

(51) Int. Cl.
*C10G 2/00* (2006.01)
*C10K 1/20* (2006.01)
*C10K 1/32* (2006.01)
*C10J 3/00* (2006.01)
*B01D 53/04* (2006.01)
*B01J 20/08* (2006.01)
*B01J 20/28* (2006.01)
*B01J 20/30* (2006.01)
*B01J 20/02* (2006.01)
*B01D 53/02* (2006.01)

(52) U.S. Cl.
CPC ............ *C01B 2203/061* (2013.01); *C10G 2/32* (2013.01); *C10G 2300/1011* (2013.01); *C10K 1/20* (2013.01); *C10K 1/32* (2013.01); *C01B 2203/042* (2013.01); *C01B 2203/0445* (2013.01); *C01B 2203/047* (2013.01); *C01B 2203/0495* (2013.01); *C10G 2300/1022* (2013.01); *C10G 2300/202* (2013.01); *C10J 3/00* (2013.01); *C10J 2300/093* (2013.01); *C10J 2300/1618* (2013.01); *C10L 2290/04* (2013.01); *C10L 2290/02* (2013.01); *C10L 2290/10* (2013.01); *C10L 2290/06* (2013.01); *C10L 2290/08* (2013.01); *C10L 2290/542* (2013.01); *B01D 53/02* (2013.01); *B01D 53/04* (2013.01); *B01D 2253/104* (2013.01); *B01D 2253/1122* (2013.01); *B01D 2253/1124* (2013.01); *B01D 2257/306* (2013.01); *B01J 20/08* (2013.01); *B01J 20/2803* (2013.01); *B01J 20/3028* (2013.01); *B01J 20/0237* (2013.01); *B01J 20/0244* (2013.01); *B01J 20/28004* (2013.01); *B01J 20/28016* (2013.01)

(56) References Cited

FOREIGN PATENT DOCUMENTS

| | | | |
|---|---|---|---|
| EP | 1 476 246 B1 | | 11/2004 |
| GB | 835751 | | 5/1960 |
| GB | 1447546 | * | 8/1976 ................ C10J 3/62 |
| IL | 69154 | * | 7/1986 ................ C01B 3/24 |
| WO | WO-2009/019497 A2 | | 2/2009 |

OTHER PUBLICATIONS

Quinn et al., "Removal of Arsine from Synthesis Gas Using a Copper or Carbon Adsorbent," *Ind. Eng. Chem. Res.*, 2006, vol. 45, No. 18, pp. 6272-6278.

International Search Report dated Jul. 9, 2012, from PCT International Application No. PCT/GB2011/052008.

International Preliminary Report on Patentability dated May 14, 2013, from PCT International Application No. PCT/GB2011/052008.

* cited by examiner

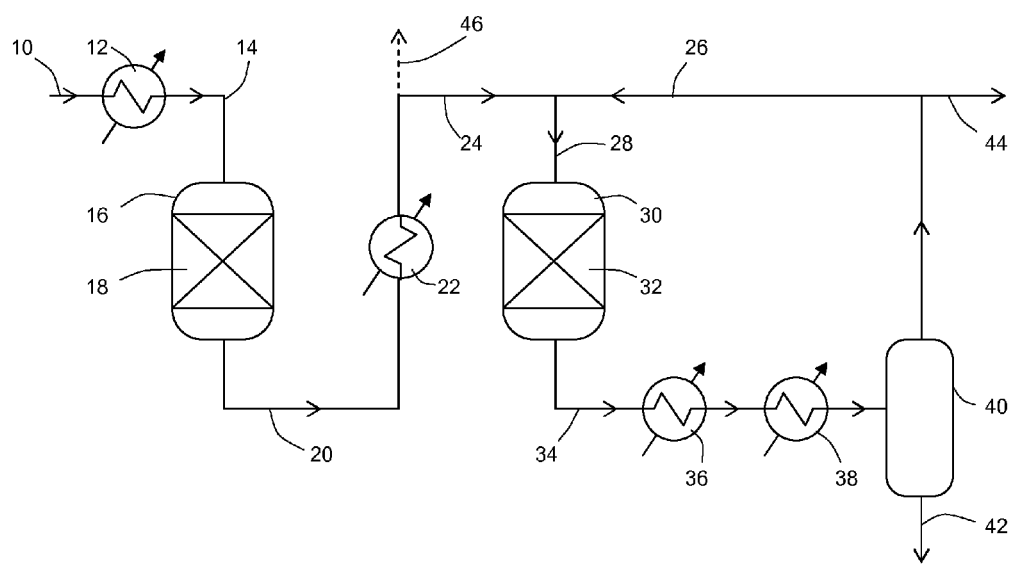

PROCESS FOR GENERATING A SYNTHETIC NATURAL GAS

CROSS-REFERENCE TO RELATED APPLICATIONS

This application is the U.S. National Phase application of PCT International Application No. PCT/GB2011/052008, filed Oct. 17, 2011, and claims priority of British Patent Application No. 1019054.4, filed Nov. 11, 2010, the disclosures of both of which are incorporated herein by reference in their entireties for all purposes.

FIELD OF THE INVENTION

This invention relates to a process for reducing the thiophene contents of gas mixtures comprising hydrogen and carbon oxides, and in particular removing thiophene from synthesis gas mixtures derived from low-temperature gasification processes.

BACKGROUND OF THE INVENTION

Synthesis gas, also termed syngas, may be generated by a gasification of carbonaceous feedstocks such as biomass, coal, petroleum coke or other carbon-rich feedstocks using oxygen or air and steam at elevated temperature and pressure. In gasification or other synthesis gas generation processes operated at low temperatures, in addition to other sulphur compounds, thiophene may be present in the resulting synthesis gas. Thiophene is a potent catalyst poison and levels as low as 1 to 5 ppb by volume gas can pose a problem for downstream catalytic processes.

EP1476246 (A1) discloses a process for the removal of sulphur compounds, particularly hydrogen sulphide ($H_2S$) and carbonyl sulphide (COS), from synthesis gas containing hydrogen, carbon dioxide and steam comprising contacting the synthesis gas at a maximum contact temperature of 100° C. with an absorbent comprising pre-reduced Cu/ZnO compounds.

SUMMARY OF THE INVENTION

The low temperature operation of the process disclosed in EP1476246 was required to avoid methanol formation and the water-gas shift reaction over the reduced copper sorbent. We have found that this process is ineffective in removing thiophene from synthesis gases.

Accordingly, the invention provides a process for reducing the thiophene content in a synthesis gas mixture, comprising the steps of (i) passing a synthesis gas mixture comprising hydrogen and carbon oxides and containing thiophene over a copper-containing sorbent disposed in a sorbent vessel at an inlet temperature in the range 200-280° C., (ii) withdrawing a thiophene depleted synthesis gas containing methanol from the sorbent vessel, and (iii) adjusting the temperature of the methanol-containing thiophene-depleted synthesis gas mixture.

The resulting gas mixture may be used in downstream processes for production of chemicals, e.g. methanol production or for the Fischer-Tropsch synthesis of liquid hydrocarbons, for hydrogen production by using water gas shift, or for the production of synthetic natural gas. Use of the thiophene depleted synthesis gas containing methanol in a downstream process to generate synthetic natural gas can be advantageous because the methanol present as a by-product from the thiophene sorbent is a suitable feed for the methanation catalyst, reacting to produce methane with a smaller exotherm than that for the CO reaction to methane.

Accordingly the invention further provides a process for generating a synthetic natural gas comprising the steps of; (i) passing a synthesis gas mixture comprising hydrogen and carbon oxides and containing thiophene over a copper-containing sorbent disposed in a sorbent vessel at an inlet temperature in the range 200-280° C., (ii) withdrawing a thiophene depleted synthesis gas containing methanol from the sorbent vessel, (iii) adjusting the temperature of the methanol-containing thiophene-depleted synthesis gas mixture to a temperature in the range 280-350° C., and (iv) passing at least a portion of the temperature-adjusted gas mixture over a nickel-containing methanation catalyst disposed in a methanation vessel to generate a crude synthetic natural gas stream.

BRIEF DESCRIPTION OF THE DRAWING

The invention is further illustrated by reference to the accompanying drawings in which;

FIG. 1 is a depiction of one embodiment according to the present invention.

DETAILED DESCRIPTION OF THE INVENTION

By the term, "sorbent", we include adsorbent and absorbent.

The thiophene content of the gas mixture, depending upon its source, may be in the range 0.5 ppb to 10 ppmv by volume, however many synthesis gases have thiophene in levels 1-100 ppbv. Coke oven gases for example may have thiophene at levels about 80 ppbv. Low temperature coal or biomass gasification may produce synthesis gases with thiophene levels in the range 1-10 ppbv. In addition to thiophene, one or more other sulphur compounds such as mercaptans, sulphides, disulphides, hydrogen sulphide and carbonyl sulphide may also be present.

It has been found that in addition to thiophene, the present invention may reduce the free oxygen ($O_2$) and olefin content of the synthesis gas mixture.

In the present invention the synthesis gas comprising hydrogen and carbon oxides (i.e. carbon dioxide and carbon monoxide) and containing thiophene may be produced by any method although it is particularly suited to synthesis gas produced by heating coal in an airless coke oven or by gasification of a carbonaceous feedstock at elevated temperature and pressure. It is from coke oven gas or low-temperature gasification processes that the problem of thiophene may be particularly observed. The carbonaceous feedstock may be coal, petroleum coke or another carbon-rich feedstock such as biomass. In low-temperature gasification, the carbonaceous feedstock is partially combusted in a gasifier in a non-catalytic process using oxygen or air and in the presence of steam at pressures up to about 35 bar abs and exit temperatures up to about 600° C., preferably up to about 550° C., to generate a raw synthesis gas comprising hydrogen and carbon oxides (carbon monoxide and carbon dioxide) and containing thiophene.

Before the synthesis gas is subjected to the sulphur removal step, the gas is preferably cooled and washed or filtered, e.g. to remove particulates such as coal ash, if present.

For the production of methanol or hydrocarbons, the desired stoichiometry ratio, R, which refers to the ratio of molar concentrations of the synthesis gas components, [R=

$[(H_2-O_2)/(CO+CO_2)]$, is preferably in the range 1.4 to 2.5. For generating synthetic natural gas (SNG) the range is preferably in the range 2.8 to 3.3.

The thiophene-containing synthesis gas may contain methane in addition to hydrogen and carbon oxides.

The thiophene-containing synthesis gas preferably comprises ≤25% carbon monoxide by volume, preferably ≤20% carbon monoxide by volume. We have observed that carbon monoxide, which may be present in amounts ≥1% by volume, adversely effects thiophene adsorption.

The thiophene-containing synthesis gas preferably comprises ≤2% steam by volume, preferably ≤1% steam by volume.

Upstream of the copper-containing sorbent, preferably within the same sorbent vessel, the thiophene-containing synthesis gas may be passed through one or more beds of sorbent for capturing $H_2S$ or other contaminants. Such sorbents include particulate zinc oxide and promoted zinc oxide sorbents.

Upstream of the sorbent vessel, the gas mixture temperature may be adjusted to the required inlet temperature by heating or cooling the thiophene-containing synthesis gas by means of one or more heat exchangers. The inlet temperature is in the range 200-280° C., preferably 200-250° C., more preferably 220-250° C. Below 200° C. the thiophene removal is inefficient, whereas above 280° C., the copper sorbent suffers excessive thermal degradation. In the event that oxygen and/or olefins are present in the gas mixture, their exothermic reaction will create a temperature rise in the surface layer of the copper-containing sorbent. In this situation it is desirable to reduce the inlet temperature by the extent of this temperature rise.

The copper-containing sorbent may be any suitable copper sorbent material. Particularly suitable sorbents comprise copper oxide or basic copper carbonate in combination with one or more oxide support materials, such as alumina, silica, titania, zeolites or zinc oxide. The sorbents may be formed by conventional means such as impregnation or co-precipitation and provided as pellets, extrudates or granules. In one preferred embodiment, the sorbent is in the form of agglomerates formed from a co-precipitated copper/zinc oxide alumina composition, bound together with a binder, for example as described in EP-A-0243052, herein incorporated by reference. Surprisingly, it has been found that iron oxide, which may be present for example in some binders, can cause unwanted side reactions. Therefore preferably the copper-containing sorbent has an iron content, expressed as $Fe_2O_3$, ≤0.5% by weight, more preferably ≤0.2% by weight, most preferably ≤0.1% by weight.

To render the sorbent effective, the copper component should be reduced in a reducing gas stream in order to convert the copper to elemental form. Reduction may be performed ex-situ or in-situ, i.e. in the sorbent vessel in which it is to be used for the desulphurisation. Known methods for causing reduction of the copper component may be used. The reducing gas stream may be the synthesis gas to be desulphurised, or a hydrogen-containing gas stream. The activation is normally performed at elevated temperature, for example in the range 200 to 250° C. and pressure in the range 1 to 100 bar abs.

The thiophene-containing synthesis gas passes through the bed of sorbent in the sorbent vessel. The thiophene is adsorbed onto the sorbent and methanol is formed by reaction of hydrogen with carbon oxides over the reduced copper sorbent. Using the sorbent of the present invention it is possible to reduce thiophene levels in the synthesis gas to the detection limit (≤2 ppbv). Not wishing to be bound by the theory, it is suggested that surface species derived from CO saturate the copper surface and at temperatures below 200° C. significantly inhibit the adsorption of thiophene, thereby reducing the rate at which it can be removed from the gas phase. Increasing temperature to 200-280° C. causes reactions with the adsorbed hydrogen to commence which improves the kinetics of thiophene capture and therefore allows the product to operate more effectively.

A thiophene-depleted, methanol containing gas mixture is recovered from the sorbent vessel. The temperature of the thiophene-depleted, methanol-containing synthesis gas is adjusted depending on the process to which is to be put. In a preferred embodiment, in order that the gas may be passed to a methanation process, it is preferably adjusted to a temperature in the range 280-350° C., more preferably 300-350° C., most preferably 310-330° C. Such temperatures are high enough for the methanation reaction to commence, but low enough such that the considerable exotherm does not overheat and damage the vessel or catalyst. This temperature adjustment can be by means of heat exchange or simply by mixing with a recycle stream at a different temperature, which is partly or fully methanated, or by a combination of these, so that the combined stream has the target temperature for feeding to the methanation process.

Thus in a preferred embodiment the process comprises part of a process for the generation of a synthetic natural gas and further comprises adjusting the temperature of the methanol-containing thiophene-depleted synthesis gas mixture to a temperature in the range 280-350° C., preferably 300-350° C., more preferably 310-330° C., and passing at least a portion of the temperature-adjusted gas mixture over a nickel-containing methanation catalyst disposed in a methanation vessel to generate a crude synthetic natural gas stream, in which the synthesis gas may be partially or fully methanated.

Conventional methanation processes may be used. For example conventional methanation catalysts, which typically comprise Ni on a refractory support, such as alumina or calcium aluminate. Methanation may be performed in one or more reactors, configured in parallel and/or in series, to form methane and water in a highly exothermic (methanation) reaction. Usually, the lower the methane content of the feed synthesis gas, the greater the number of reactors will be required. If the feed gas contains carbon oxides and hydrogen in close to stoichiometric ratio (R=3.0), then a high purity methane stream (typically methane>95 vol %) can be produced. The methanol formed over the copper-sorbent is conveniently decomposed endothermically to hydrogen and carbon oxides, which are re-combined to form additional methane. The reactions are as follows;

$$CO+3H_2 \rightarrow CH_4+H_2O$$

$$CO_2+4H_2 \rightarrow CH_4+2H_2O$$

$$CH_3OH \rightarrow CO+2H_2$$

The hot crude synthetic natural gas streams, which leave the one or more methanation reactors, which may be at a temperature in the range 350-650° C., are desirably cooled in a series of heat exchangers, which may generate or superheat steam, and which may be used to heat the thiophene-containing synthesis gas feed to the sorbent vessel and/or the thiophene-depleted, methanol-containing feed to the methanation vessel. The crude synthetic natural gas streams recovered from the one or more methanation vessels are desirably cooled to below the dew point at which the steam condenses, and the process condensate removed using one or more separators. The synthetic natural gas may then be recovered from the one or more separators, preferably after the last methanation vessel.

It is preferred that, in order to moderate and control the methanation exotherm in the first and optionally second methanation vessels, a portion of the crude synthetic natural gas that has been at least partially de-watered by cooling and separation of the condensate, i.e. a synthetic natural gas stream, is recycled, optionally after heating, to that methanation reactor.

In FIG. 1, a synthesis gas stream 10 derived from coke oven gasification comprising about 57% vol hydrogen, about 1% vol steam, about 8% vol carbon monoxide, about 3% vol carbon dioxide, about 25% vol methane and between 1 and 80 ppb thiophene in addition to $H_2S$ and COS, at a pressure of 25 bara and a temperature of 350° C., is cooled to 230° C. in a heat exchanger 12 and fed via line 14 to a sorbent vessel 16 containing a bed of particulate pre-reduced $Cu/ZnO/Al_2O_3$ sorbent 18. The synthesis gas passes through the bed in which the thiophene is adsorbed and methanol is generated. The methanol formation is exothermic and so the gas leaving vessel 16 is at a temperature in the range 250-270° C. The thiophene-depleted, methanol-containing synthesis gas is recovered from vessel 16 via line 20 and passed though one or more heat exchangers 22 in which its temperature is adjusted to a temperature in the range 300-350° C. The heated gas from exchanger 22 in line 24 is mixed with a recycle stream in 26 and the mixed gas passed via line 28 to a methanation vessel 30 containing a bed of a particulate nickeliferous methanation catalyst 32. As the gas mixture passes through the bed 32, the methanation reactions proceed in which the hydrogen and carbon oxides react to form methane and steam. The methanol present in the mixed gas endothermically decomposes to hydrogen and carbon oxides, which then react over the methanation catalyst to form additional methane. A crude synthetic natural gas at a temperature of about 620° C. is recovered from the methanation vessel 30 via line 34, and is cooled in a series of two or more heat exchangers 36 and 38 to below the dew point, thereby condensing steam. The cooled stream is fed to a separator 40 from which the condensate is recovered as stream 42. A synthetic natural gas stream is recovered from the separator as stream 44. A portion of the synthetic natural gas stream is taken from line 44 via line 26 as the recycle stream.

In a variant of this process, the thiophene-containing synthesis gas stream 10 is derived from low temperature gasification of coal and comprises hydrogen, steam, carbon oxides and between 1 and 10 ppb thiophene in addition to $H_2S$ and COS, at a pressure of 30 bara and a temperature of 30° C. It is heated to 230° C. in a heat exchanger 12 and fed via line 14 to the sorbent vessel 16 containing a bed of particulate pre-reduced $Cu/ZnO/Al_2O_3$ sorbent 18

In a further variant of this process, a portion of the thiophene-depleted, methanol-containing synthesis gas is recovered from line 24 via line 46 and fed to one or more further conversion processes, which may include water-gas shift, methanation, methanol synthesis and/or the Fischer-Tropsch synthesis of hydrocarbons.

EXAMPLES

The invention is further described by reference to the following Examples.

Example 1

PURASPEC$_{JM}$™ 2088, a $Cu/ZnO/Al_2O_3$ based absorbent, available from Johnson Matthey Catalysts, was tested for its ability to remove thiophene from two different gas feedstocks. The different gas feedstocks were:

| Feed Gas Composition A | Feed Gas Composition B |
| --- | --- |
| Hydrogen: 32.3 vol % | Hydrogen: 12.0 vol % |
| Carbon monoxide: 10.5 vol % | Carbon monoxide: 0.0 vol % |
| Carbon dioxide: 4.0 vol % | Carbon dioxide: 4.0 vol % |
| Thiophene: 80 vppb | Thiophene: 80 vppb |
| Nitrogen/methane: balance | Nitrogen/methane: balance |

Composition A was used to simulate a coke-oven derived synthesis gas. Composition B was employed as a counterpoint in order to investigate the influence of carbon monoxide on the corresponding removal of thiophene The PURASPEC$_{JM}$™ 2088 sample employed (2.8-4.75 mm granules) was loaded into a plug flow reactor in its oxide form and subsequently reduced in situ prior to the start of the test. The conditions employed for the test were as follows:
Temperature: 170-230° C.
Pressure: 25 barg
Space velocity: 10,000 $Nm^3/m^3/hr$ Table 1 below summarizes the thiophene removal performance measured sequentially at each point in the test.

TABLE 1

PURASPEC$_{JM}$ 2088 thiophene removal performance under various conditions

| Feed gas | Temperature (deg C.) | Measured thiophene slip (vppb)[a, b] | % Thiophene removal |
| --- | --- | --- | --- |
| Composition B | 170 | 0 | 100 |
| Composition A | 170 | 58 | 27.5 |
| Composition A | 190 | 38 | 52.5 |
| Composition A | 210 | 16 | 80.0 |
| Composition A | 230 | 0 | 100 |

[a] average of at least three measurements
[b] Thiophene detection limit 2 vppb

Comparing the performance of the $Cu/ZnO/Al_2O_3$ product at 170 degC with feed composition A versus feed composition B, it is clear that the presence of carbon monoxide significantly hinders the corresponding uptake of thiophene. However, feeding the synthesis gas to the sorbent at 230° C. completely removes the thiophene, which is only incompletely removed at 170° C.

The invention claimed is:
1. A process for generating a synthetic natural gas comprising the steps of:
(i) passing a synthesis gas mixture comprising hydrogen and carbon oxides, having a stoichiometry ratio, $R=(H_2-CO_2)/(CO+CO_2)$, in the range of 2.8 to 3.3, and containing thiophene through a fixed bed of copper-containing sorbent disposed in a sorbent vessel at an inlet temperature in the range of 200-280° C., the copper-containing sorbent provided in a form of at least one of a pellet, extrudate, and granule,
(ii) withdrawing a thiophene depleted synthesis gas containing methanol from the sorbent vessel,
(iii) adjusting the temperature of the methanol-containing thiophene-depleted synthesis gas mixture to a temperature in the range of 280-350° C. to form a temperature-adjusted gas mixture, and
(iv) passing at least a portion of the temperature-adjusted gas mixture over a nickel-containing methanation catalyst disposed in a methanation vessel to generate a crude synthetic natural gas stream.

2. A process according to claim 1 wherein the thiophene content of the synthesis gas mixture is in the range of 0.5 ppb to 10 ppm by volume.

3. A process according to claim 1 wherein the thiophene-containing synthesis gas mixture is formed by heating coal in an airless coke oven.

4. A process according to claim 1 wherein the thiophene-containing synthesis gas mixture is formed by gasification of a carbonaceous feedstock at elevated temperature and pressure.

5. A process according to claim 4 wherein the carbonaceous feedstock is biomass or coal.

6. A process according to claim 5 wherein the gasification is performed in a gasifier using oxygen or air and in the presence of steam at a pressure up to about 35 bar abs and an exit temperature up to about 600° C.

7. A process according to claim 1 wherein the thiophene-containing synthesis gas comprises ≤25% carbon monoxide by volume.

8. A process according to claim 1 wherein the copper-containing sorbent comprises agglomerates formed from a co-precipitated copper/zinc oxide alumina composition, bound together with a binder.

9. A process according to claim 1 wherein the crude synthetic natural gas stream is cooled to below the dew point, and condensed water is separated to form a synthetic natural gas.

10. A process according to claim 9 wherein a portion of the synthetic natural gas is recycled to the methanation vessel.

11. A process according to claim 1 wherein the thiophene-containing synthesis gas comprises ≤20% carbon monoxide by volume.

12. A process according to claim 1 wherein the thiophene-containing synthesis gas mixture is formed by gasification of a carbonaceous feedstock at elevated temperature and pressure, followed by cooling and either washing or filtering the resulting gas stream to remove particulate material.

13. A process according to claim 1 wherein the copper-containing sorbent has an iron content, expressed as $Fe_2O_3$, ≤0.5% by weight.

* * * * *